United States Patent [19]

Roncato

[11] 4,063,479
[45] Dec. 20, 1977

[54] STRAND CUTTING APPARATUS

[75] Inventor: Giordano Roncato, Aix-les-Bains, France

[73] Assignee: Saint-Gobain Industries, Neuilly-sur-Seine, France

[21] Appl. No.: 719,916

[22] Filed: Sept. 2, 1976

[30] Foreign Application Priority Data

Sept. 4, 1975 France .............................. 75.27084

[51] Int. Cl.$^2$ ............................................. D01G 1/04
[52] U.S. Cl. ...................................... 83/117; 83/138; 83/346; 83/913
[58] Field of Search ................. 83/117, 116, 115, 913, 83/346, 347, 138, 139

[56] References Cited

U.S. PATENT DOCUMENTS

| | | | |
|---|---|---|---|
| 2,038,336 | 4/1936 | Bachmann | 83/117 X |
| 2,518,960 | 8/1950 | Tollison et al. | 83/117 X |
| 3,055,374 | 9/1962 | Koch et al. | 83/117 X |
| 3,353,431 | 11/1967 | Mylo | 83/116 |
| 3,555,947 | 1/1971 | Fram | 83/116 |

Primary Examiner—J. M. Meister
Attorney, Agent, or Firm—John T. Synnestvedt

[57] ABSTRACT

Process and apparatus for cutting continuous strand or roving, particular strands of mineral material such as glass, into short lengths is disclosed. The apparatus employs a rotatable drum equipped with a large number of radially disposed cutting blades, the drum cooperates with a supporting device for supporting the strand as it is cut. Ejector bars are maintained in position on the drum between adjacent cutting blades by elastic mounting members that receive the ends of the ejector bars. The elastic mounting members cause the ejector bars to compress the strand against the support drum as the strand is being cut and, in conjunction with centrifugal force arising from rotation of the drum, to eject the cut pieces of strand from the cutting drum.

11 Claims, 9 Drawing Figures

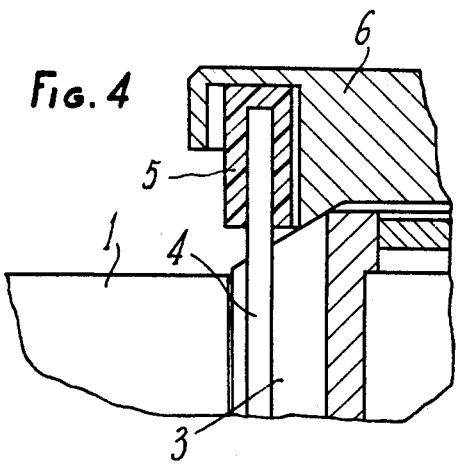
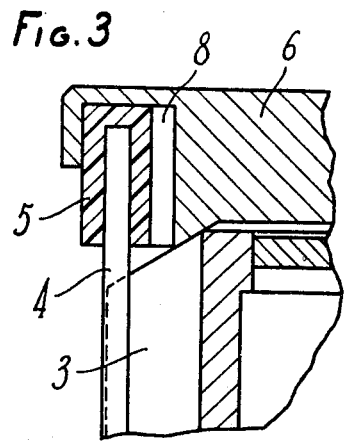
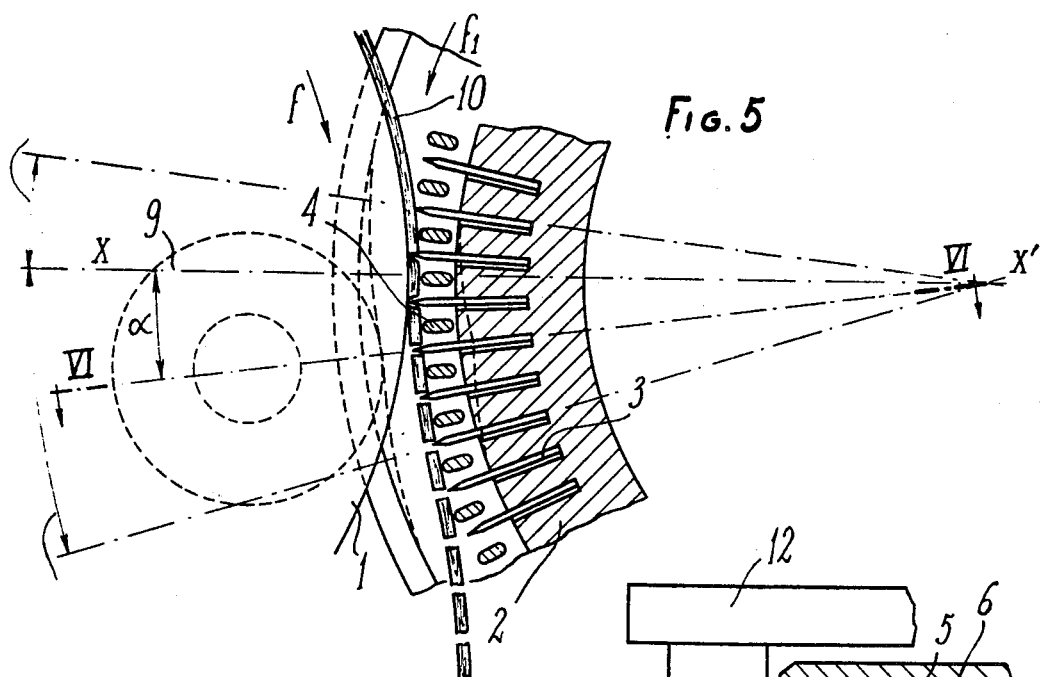
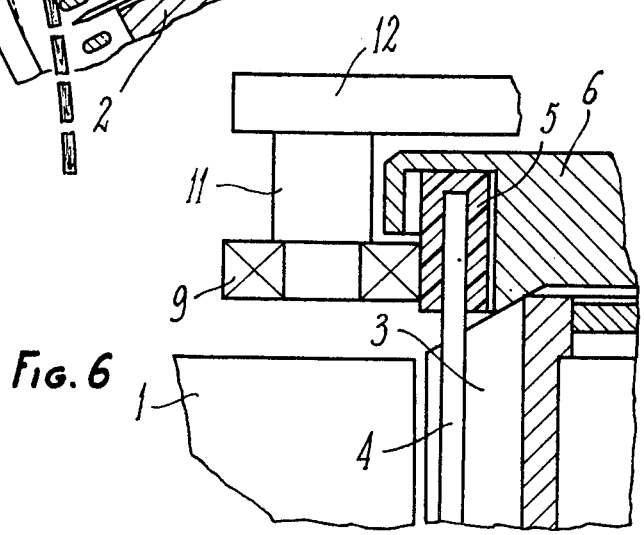

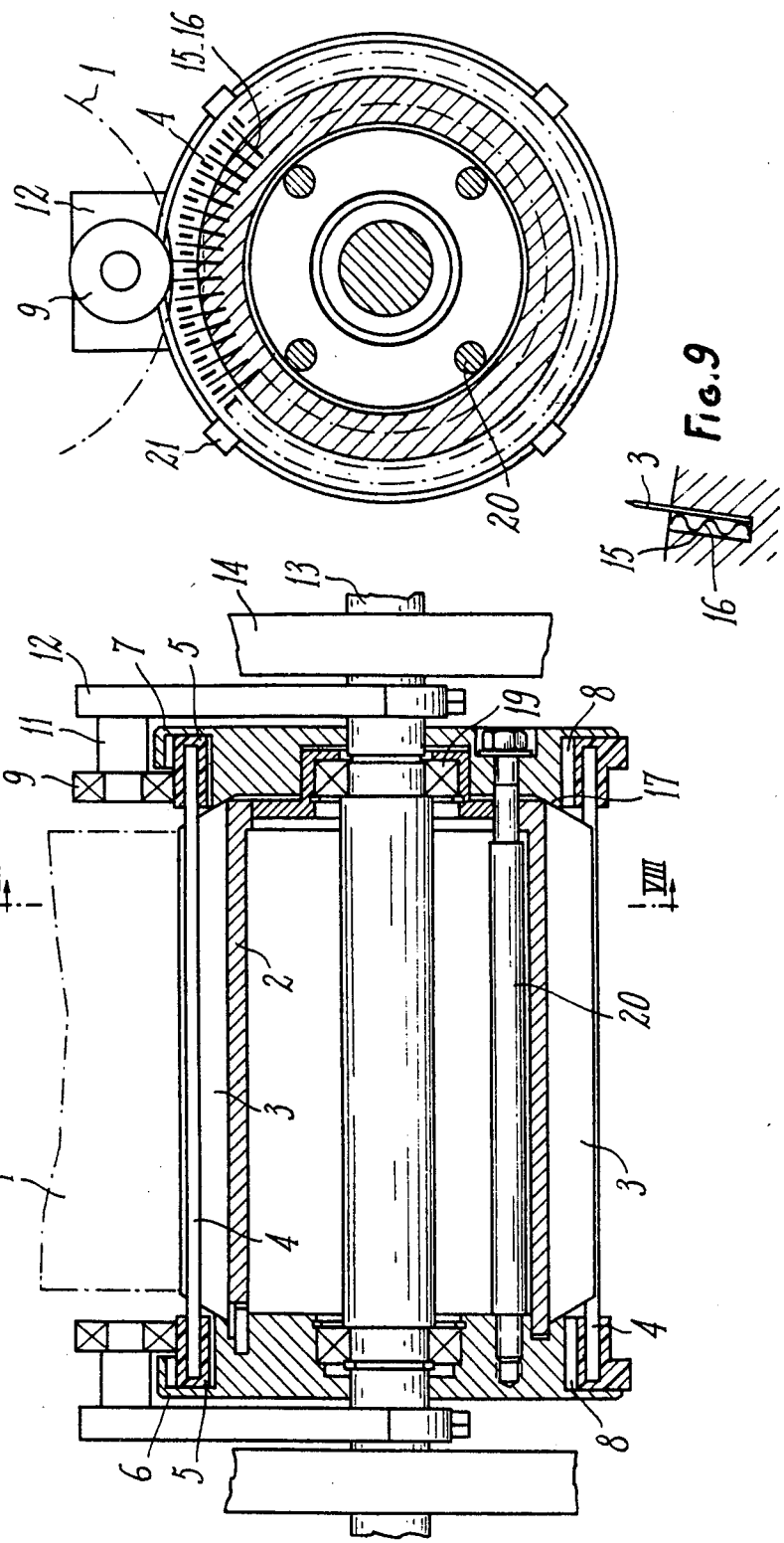

STRAND CUTTING APPARATUS

BACKGROUND OF THE INVENTION

This invention relates to cutting threads into short sections, particularly threads in the form of rovings of untwisted or slightly twisted strands of a mineral substance such as glass fibers.

Short pieces of glass fiber rovings, usually in lengths between 3 to 12 millimeters have been found to be useful as a reinforcement material in synthetic polymeric resins which are cast or molded into complex shapes. Rovings possess relatively little cohesion, and as a consequence, the individual strands of which they are constituted tend to separate during the cutting operation in which the pieces are cut from a continuous length of roving. This results in the formation of a considerable quantity of waste material in the form of fibers and particles which, as the cutting operation proceeds, tends to fill and to be packed into the spaces between cutting blades carried by a rotating cutting drum. This tends to make the cutting process faulty and can result in waste material being introduced into the cuttings.

It has been known to cut rovings into short lengths by the use of a rotating drum having radially extending cutting blades, which drum acts in conjunction with a rotating support drum, the rovings being carried on the support drum and being cut by the blades as the blades come into contact with the surface of the support drum.

One type of roving cutting apparatus employing means for ejecting the cut pieces from between adjacent cutting blades is shown in U.S. Pat. No. 3,555,947. In devices of the type illustrated in the aforementioned patent, a drum formed of a plurality of ejecting bars is mounted for rotation eccentrically with respect to the axis of rotation of the drum to which the cutting blades are attached. In certain apparatus of the type generally shown in the mentioned patent, guides are utilized for guiding the movement of the ejecting bars between the cutting blades. A drawback of this apparatus is that the fibrous wastes resulting from the cutting operation become lodged in the guides that are located between the ejection bars and the cutting blades. As a result of metal-to-metal contact as the ejecting bars move in their guides, a black powder is produced, which falls into the finished cuttings and thus renders the cuttings unmarketable. Moreover, the metal-to-metal contact of the ejecting bars and the guides over a period of time, results in wear of the various parts, necessitating their replacement. In addition, during operation, this apparatus has a very high noise output level, which is an important factor with respect to worker fatigue. Finally, the friction developed by the metal-to-metal mounting of the components and the high noise level of the apparatus limits its speed of rotation and, consequently, its production capacity.

Certain other arrangements for cutting rovings and employing drums having ejector elements for urging cuttings from spaces between cutting blades are shown in Applicant's U.S. Pat. Nos. 3,942,401 and 3,945,280. In these arrangements, the ejector elements comprise flexible bars that are secured at each of their ends to the cutting drum, the central portions of the ejector bars being free to move radially with respect to the axis of rotation of the cutting drum in the spaces between adjacent blades.

SUMMARY OF THE INVENTION

The object of the invention is to provide apparatus for cutting continuous strand or roving into short segments, which apparatus ejects the segments from a cutting drum in a reliable and complete fashion, provides against the collection of waste material in components of the apparatus, thereby avoiding the soiling of the finished cuttings and prolonging of the life of the mechanical components of the apparatus, has a lower noise level output during operation, and has increased output capacity.

These and other objects are achieved by resiliently mounting the ends of the ejector bars on the cutting drum. Such resilient mounting is accomplished in the preferred embodiment by mounting the ends of the ejector bars in elastic rings. The force exerted on the ejector bars causes the bars to compress the strand against a support means as the strand is being cut and also, in conjunction with centrifugal force imparted to the cut segments and the ejector bars by rotation of the cutting drum, causes the ejector bars to eject cut segments from the spaces between adjacent cutting blades.

In one aspect of the invention, means, such as rollers, locally deform the elastic rings to provide for the displacement of the ejector elements in the cutting zone.

As a result of mounting of ejector bars in the elastic rings, the following advantages are obtained:

Metal-to-metal contact between the ejector bars and other components of the cutting drum, such as guides, is eliminated, thereby reducing wear and noise output, Each ejector bar is capable of moving radially along its entire length in a space between adjacent cutting blades, and The collection of cut fiber waste deposits or flock between relatively moving components of the cutting drum and the consequent soiling of the finished product is suppressed.

Other characteristics and advantages of the invention will become evident from the description that follows.

DESCRIPTION OF THE PREFERRED EMBODIMENT

FIG. 3 is a partial sectional view taken along line III—III of FIG. 1.

FIG. 4 is a partial sectional view taken along line IV—IV of FIG. 1.

FIG. 5 is a partially schematic, cross sectional view showing the general arrangement of a second embodiment.

FIG. 6 is a partial cross sectional view taken along VI—VI of FIG. 5.

FIG. 7 is a longitudinal axial sectional view of the embodiment illustrated in FIG. 5.

FIG. 8 is a cross sectional view taken along line VIII—VIII of FIG. 7.

FIG. 9 is a detailed view showing the mounting of the cutting blades.

Figure 1:
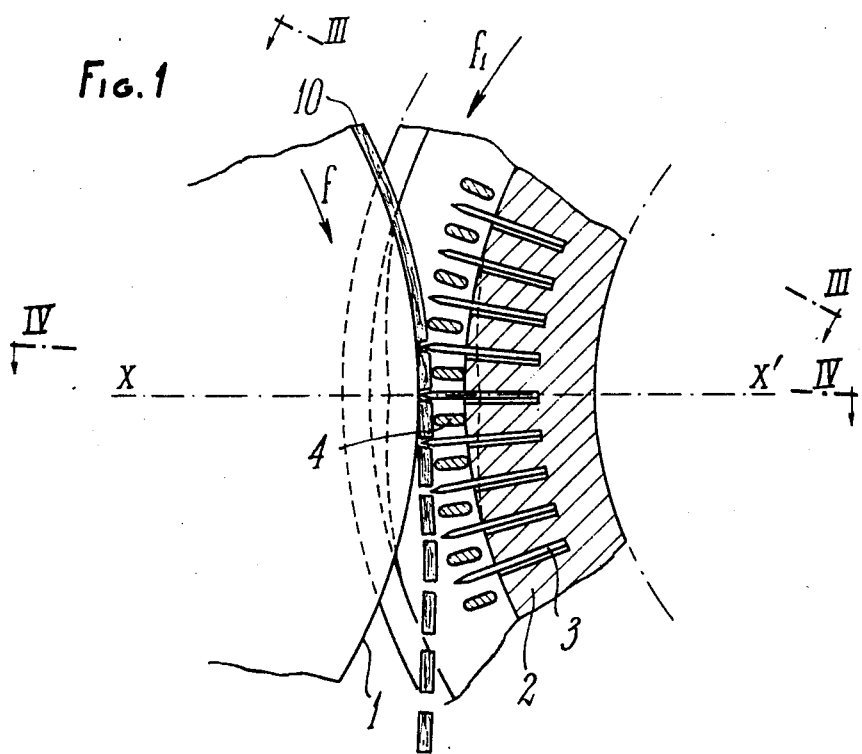
FIG. 1 is a partial schematic cross sectional view showing the general arrangement of a device according to the invention.

As is schematically represented in FIG. 1, a preferred embodiment of the invention includes a supporting apparatus that is normally comprised of an anvil drum 1 that is rotatable about its longitudinal axis in the direction of the arrow f, and a cutting drum 2 rotatable about its longitudinal axis in the direction of arrow $f_1$. The cutting drum 2 includes a plurality of radially disposed cutting blades 3 and an ejection means comprised of a plurality of ejector bars 4. One of the bars 4 is disposed in each of the spaces between adjacent cutting blades. Preferably, the ejector bars are positioned so that the outer surfaces of the bar are just even with, or slightly beyond, for example 0.1 to 0.2 mm, the cutting edges of the blades 3, when the bars are not positioned at the cutting and ejecting zones, which will hereinafter be described.

As FIGS. 3 and 4 illustrate, the ends of each bar 4 are received in opposed elastic mounting rings 5, formed of an elastomeric material. One elastomeric material that has been found useful for this purpose is a polyurethane elastomer having Shore hardness of 90A and 40D. The rings 5 preferably are formed by molding and include an annular array of spaced apertures formed in one of the side walls thereof, for snugly receiving the ends of the bars 4. The rings 5 are disposed in annular grooves provided in each of the end plates 6 and 7. The rings 5 are positioned in the grooves with the outermost edge of the rings 5 against the radially outermost surface of the groove, as shown in FIG. 3. The width of the groove in a radial direction is greater than the radial width of the elastic ring, and thus a free space 8 exists between the inside diameter of the elastic ring and the inside diameter of the groove. If a portion of the elastic ring is locally deformed by a force applied in a direction toward the interior of the drum 2, that portion of the ring can be displaced toward the inside of the groove into the free space 8.

In the embodiment depicted in FIG. 1, a plurality of strands, such as the strand 10, are brought into the apparatus by first passing the strands over the anvil drum 1. As the strands are brought into the cutting zone, the center of which occurs along the line XX', the strands engage the cutting blades and also the ejector bars 4. As rotation of the two drums continues, the strands push the ejector bars radially inwardly toward the axis of rotation of the cutting drum. The ends of the ejector bars locally deform the portions of the mounting rings in which they are mounted so that those portions enter the free space 8, as illustrated in FIG. 4. This local deformation of the resilient, elastic rings 5 creates a restoring force in the portions of the rings 5 that are deformed, that urges the bars outwardly.

Thus, the strand passes through a first zone where it is subjected to a compression. This compression is produced by the bars 4, forcing the strand against the wall of the drum 1, by the action of the restoring force of the elastic rings 5 and the effect of the centrifugal force to which the bars are subjected by the rotation of the drum 2. Thus, during the part of the process where the cutting blades cut the strand, the strand is maintained under compression by the ejector bars. The cutting blades thereafter cut the strand, which passes finally into a second zone in which the ejection of the cut sections is effected.

The bars are mounted without clearance or play in the elastic rings 5, and the rings 5 sweep successively along the length of the grooves in the end plates 6 and 7. Thus, the need for guide structure is eliminated and the problem of admission of cut fiber waste between the bars and guide structure is avoided. In addition, all ejector bars are isolated from adjacent metallic structures by the elastic rings, thereby eliminating sliding metal to metal contact and reducing excessive wear and noise.

As a result of the action of the ejector bars 4, which are retracted from the level of the cutting edge of the the blades 3 in the cutting zone and which thereafter regain their outermost position at which their exterior surface is for all practical purposes at the level of the cutting edge of the blades 3, the strand segments are forceably ejected from the cutting drum immediately after the cutting operation. The segments are also subjected to and thrown outwardly by centrifugal force arising from rotation of the drum.

Figure 2:
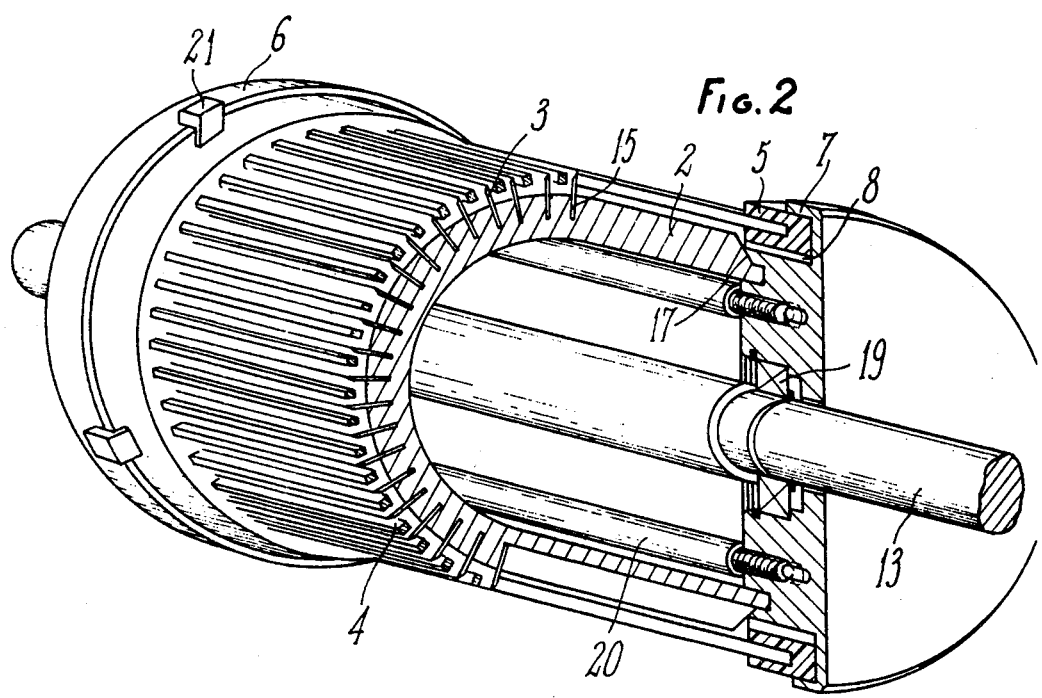
FIG. 2 is a partial, perspective view of the device.

As shown in FIG. 2, each of the mounting rings 5 has a plurality of integral projections 21 that are received in cooperatively sized slots in the end plates 6 and 7. The purpose of the projections 21 is to prevent rotation of the mounting rings with respect to the end plates so that the ejector bars remain precisely positioned between the cutting blades. The displacement of the bars 4 in a longitudinal direction is limited by the rings 5 and the end plates 6 and 7. The transverse displacement of bars 4 is a function of the yieldability of the elastic rings and width of the space 8.

The cutting blades 3 mounted on the drum 2 are held in the slots 15 of the drum by means of corrugated springs (see FIG. 9) and are held at each end by a conical surface 17 on each of the end plates 6 and 7. The drum 2 is mounted on the shaft 13 by means of bearings 19. The assembly constituted by the drum 2 and the end plates 6 and 7 is secured together by means of four braces 20. The bearings 19 permit the assembly to turn freely about the longitudinal axis of shaft 13.

It should be noted that the cutting drum and anvil drum can be mounted in suitable support structure as illustrated in the aforementioned U.S. Pat. Nos. 3,942,401 and 3,945,280. Also, suitable driving means are employed for rotating the drum 2.

FIGS. 5–8 illustrate a second embodiment. In this embodiment, two rollers 9 are positioned in contact with the mounting rings 5 in the region of the cutting zone in such a manner that, as the drum rotates, each roller pushes portions of the rings toward the inside diameter of the grooves in the end plates, as illustrated in FIG. 6.

As shown in FIG. 6, each roller 9 is mounted on an arm 12 by a stub shaft 11. The rollers can be disposed at an angular distance $\alpha$ from the center of the cutting zone. This angular distance is represented by the angle $\alpha$ formed by the intersection of the axes X—X' that passes radially through the center of the cutting zone, and axis VI—VI that passes from the axis of rotation of the drum 2 through the axis of rotation of roller 9. The axes of rotation of each of the rollers 9 are parallel to the axis of rotation of drum 2. The arms 12 are mounted in adjustable fashion on the shaft 13 in order that the angle $\alpha$ can be varied.

As is seen in FIGS. 7 and 8, as the unit comprised of drum 2, blades 3, ejectors 4, flanges 6 and 7, mounting rings 5, is rotated about the shaft 13, the rollers 9 engage the mounting rings and urge the elastic rings toward the inside diameter of the grooves in the end plates 6 and 7 in the region of the cutting zone, which causes the ejectors to move inwardly, away from the cutting edges of the blades 3.

The arrangement utilizing rollers 9 has the following advantages:

It enables the positioning of the fiber compression zone and the zone of ejection of the cut segments to be controlled, It enables regulation of the pressure of the ejectors on the anvil drum so that the strand is not crushed between the anvil drum and the ejector bars 4, The life or durability of the mounting rings is increased because the force applied to the rings to retract them is less localized.

EXAMPLE

Segments of 3 to 6 mm in length were made from glass fiber rovings.

The apparatus according to the invention was fed strands from a creel, each strand being equivalent to 40,000 tex. The rotation speed of the cutting drum was 700 rpm, and the resulting velocity of the unraveling strand to be cut was 250 meters per minute. The output of cuttings was 600 kg per hour.

The cuttings were of excellent appearance, there being substantially no flock or waste in them. The occurence of over-cutting, which produces segments of lengths shorter than 3 mm, is alleviated through the action of the ejectors.

The total duration of the test was 200 hours without any need for cleaning of the cutting drum. After these 200 hours of operation, it was verified that the cutting drum showed no trace of flock waste or size.

I claim:

1. Apparatus for cutting continuous lengths of filamentary material into segments comprising a support means for supporting the material to be cut, a drum, a plurality of cutting blades disposed on the drum and extending outwardly therefrom, means mounting the drum for rotation adjacent the support means, the cutting edges of the cutting blades being successively brought to a cutting zone formed in conjunction with the support means for cutting material in the cutting zone, elongate ejector members disposed in spaces between cutting blades for compressing the material against the support means when the material is in the cutting zone and for ejecting the cut segments of material from the drum when the material has passed the cutting zone, and resilient, yieldable ejector mounting means formed of an elastomeric material for mounting the ends of the ejector members on the drum.

2. Apparatus as in claim 1 wherein the ejector mounting means comprises an annular member formed of said elastomeric material, the annular member including means for receiving end portions of the ejector members.

3. Apparatus as in claim 2 wherein the drum includes an end plate and means on the end plate for receiving the annular member.

4. Apparatus for cutting continuous lengths of filamentary material into segments comprising a support means for supporting the material to be cut, a drum, a plurality of cutting blades disposed on the drum and extending outwardly therefrom, means mounting the drum for rotation adjacent the support means, the cutting blades being successively brought to a cutting zone formed in conjunction with the support means for cutting material in the cutting zone, elongate ejector members disposed in spaces between cutting blades for compressing the material against the support means when the material is in the cutting zone and for ejecting the cut segments of material from the drum when the material has passed the cutting zone, resilient, yieldable ejector mounting means for mounting the ends of the ejector members on the drum, comprising an annular member formed of an elastomeric material and means on the member for receiving end portions of the ejector members, an end plate mounted on the drum and means on the end plate for receiving the annular member, the receiving means comprising an annular groove, concentric with the axis of rotation of the drum, the radial width of the groove being greater than the radial width of the annular elastomeric member.

5. Apparatus as in claim 4 wherein the ejector elements, when not in the cutting zone, are positioned near or beyond cutting edges of the cutting blades in a position such that the material bears against the ejector elements in the cutting zone and causes displacement of the ejector mounting means.

6. Apparatus for cutting continuous lengths of filamentary material into segments comprising a support means for supporting the material to be cut, a drum having a pair of opposed end plates, a plurality of cutting blades disposed on the drum and extending outwardly therefrom, means mounting the drum for rotation adjacent the support means, cutting edges of the cutting blades being successively brought to a cutting zone formed in conjunction with the support means for cutting material in the cutting zone, elongate ejector bars extending across the drum and disposed in spaces between cutting blades for compressing the material against the support means when the material is in the cutting zone and for ejecting the cut segments of material from the drum when the material has passed the cutting zone, and a pair of resilient, yieldable ejector mounting members for mounting the ends of the ejector bars on the drum, one mounting member being mounted on each end plate.

7. Apparatus as in claim 6 wherein the ejector mounting members comprise rings formed of an elastic material, the rings including means for receiving the ends of the ejector bars.

8. Apparatus as in claim 1 and further comprising means engaging the ejector mounting means in the region of the cutting zone for moving the successive ejector members inwardly of the cutting edges of the cutting blades.

9. Apparatus as in claim 8 wherein the displacing means comprises a roller and means for mounting the roller in contact with the ejector mounting means.

10. Apparatus as in claim 9 wherein the roller mounting means includes means for changing the angular position of the roller with respect to the axis of rotation of the drum.

11. Apparatus for cutting continuous lengths of material comprising a support means for supporting material to be cut, a drum, a plurality of cutting blades mounted on the drum with cutting edges of the blades disposed outwardly therefrom, means mounting the drum for rotation adjacent the support means whereby successive cutting blades, in conjunction with the support means, form a cutting zone, mounting members formed of elastomeric material mounted adjacent each end of the drum, ejector bars disposed between adjacent cutting blades and extending across the drum for compressing the material against the support means and ejecting the cut segments of material from the drum when the cutting blades have passed the cutting zone and means on the mounting members for receiving the ends of the ejector bars.

* * * * *